US008484471B2

(12) United States Patent
Furukawa

(10) Patent No.: US 8,484,471 B2
(45) Date of Patent: Jul. 9, 2013

(54) MULTI-PARTY DISTRIBUTED MULTIPLICATION DEVICE, MULTI-PARTY DISTRIBUTED MULTIPLICATION SYSTEM AND METHOD

(75) Inventor: Jun Furukawa, Tokyo (JP)

(73) Assignee: NEC Corporation, Tokyo (JP)

( * ) Notice: Subject to any disclaimer, the term of this patent is extended or adjusted under 35 U.S.C. 154(b) by 131 days.

(21) Appl. No.: 13/063,410

(22) PCT Filed: Oct. 7, 2009

(86) PCT No.: PCT/JP2009/067506
§ 371 (c)(1),
(2), (4) Date: Mar. 10, 2011

(87) PCT Pub. No.: WO2010/041690
PCT Pub. Date: Apr. 15, 2010

(65) Prior Publication Data
US 2011/0176677 A1     Jul. 21, 2011

(30) Foreign Application Priority Data

Oct. 7, 2008  (JP) ................................ 2008-260509

(51) Int. Cl.
*H04L 9/12* (2006.01)
*H04L 9/32* (2006.01)
(52) U.S. Cl.
USPC ........................................... 713/168; 726/29
(58) Field of Classification Search
None
See application file for complete search history.

(56) References Cited

U.S. PATENT DOCUMENTS

| 7,933,410 B2* | 4/2011 | Fahrny | 380/201 |
| 2005/0114666 A1* | 5/2005 | Sudia | 713/175 |
| 2007/0078775 A1* | 4/2007 | Huapaya et al. | 705/59 |
| 2008/0240447 A1* | 10/2008 | Zhu et al. | 380/279 |
| 2011/0004758 A1* | 1/2011 | Walker et al. | 713/168 |

FOREIGN PATENT DOCUMENTS

| JP | 2000216774 A | 8/2000 |
| WO | 9962221 A | 12/1999 |
| WO | 2007018311 A | 2/2007 |

OTHER PUBLICATIONS

International Search Report for PCT/JP2009/067506 mailed Dec. 28, 2009.
O. Goldreich, Foundations of Cryptography, vol. II Basic Applications, Cambridge University Press, ISBN 0-521-83084-2, May 2004, pp. 643-645.

* cited by examiner

*Primary Examiner* — Venkat Perungavoor

(57) ABSTRACT

A multi-party variance multiplication device includes: an initial setting device which generates a first public key by using an inputted system parameter; a commitment generation device which generates a commitment of a first input value based on the system parameter and a random number; an encryption device which generates an encrypted text of the first input value based on the system parameter, the random number, and the first public key; an authentication device which generates a certificate that authenticates a range of the first input value based on the system parameter, the random number, the first public key, and the second public key already public; a decryption device which generates a decrypted text by decrypting a noisy encrypted text based on the system parameter, the first public key, and a private key; and a noise removal device which generates a product variance by removing a noise from the decrypted text.

11 Claims, 4 Drawing Sheets

MULTI-PARTY DISTRIBUTED MULTIPLICATION DEVICE, MULTI-PARTY DISTRIBUTED MULTIPLICATION SYSTEM AND METHOD

This Application is the National Phase of PCT/JP2009/067506, filed Oct. 7, 2009, which claims the Priority right based on Japanese Patent Application No. 2008-260509 filed on Oct. 7, 2008 and the disclosure thereof is hereby incorporated by reference in its entirety.

TECHNICAL FIELD

The present invention relates to a technique which enables a calculation of a product of two values held at a plurality of devices in a distributed manner by allowing those devices to communicate with each other so that the product thereof can be held at those devices in a distributed manner.

BACKGROUND ART

As a related multi-party distributed multiplication device, there is a method which uses a system described in Non-Patent Document 1.

The method of Non-Patent Document 1 will be described hereinafter.

In Non-Patent Document 1, two arithmetic operation devices A, B are used, and values of a[1] and b[1] are inputted to one of the devices, A. Further, values of a[2] and b[2] are inputted to the other device B. The values a[1], b[1], a[2], and b[2] inputted to each of the devices A and B are set to be in relations of a[1]∈Z/2Z, b[1]∈Z/2Z, a[2]∈Z/2Z, and b[2]∈Z/2Z.

The two devices A and B of Non-Patent Document 1 execute arbitrary calculations in a distributed manner based on addition as well as multiplication of the inputted values (bits distributing to the two devices) by communicating with each other, and the device A outputs a value c[1] and the device B outputs a value c[2], respectively. The value c[1] outputted by the device A and the value c[2] outputted by the device B are in a relation satisfying c[1]+c[2]=(a[1]+a[2])(b[1]+b[2]). Moreover, the value c[1] and c[2] are set to be in relations of c[1]∈Z/2Z and c[2]∈Z/2Z. That is, the method of Non-Patent Document 1 is capable of distributing the product of a bit (a[1]+a[2]) and a bit (b[1]+b[2]) distributed to the respective devices A and B in a form of the sum again to the two devices A and B in a form of the sum as in c[1]+c[2].

In the meantime, in a case where the sum of the bit (a[1]+a[2]) and the bit (b[1]+b[2]) are distributed again to the respective devices A and B in a form of the sum as in c[1]+c[2], c[1] and c[2] turn out as c[1]=a[1]+b[1] and c[2]=a[2]+b[2], respectively, as a result of executing calculations in the two devices A and B in a variant manner. Thus, it is easy to distribute the sum of the bit (a[1]+a[2]) and the bit (b[1]+b[2]) again to the two devices A and B in a form of the sum as in c[1]+c[2].

As described above, according to Non-Patent Document 1, the use of two arithmetic operation devices make it possible to perform an arithmetic operation based on the bit values shared in the two devices. Thus, it is possible to employ distributed calculation processing according to Non-Patent Document 1 to arithmetic operation processing using a logic circuit. Further, since an arithmetic operation on a large ring can be written in a bit arithmetic operation, it is possible to employ the variant calculation processing of Non-Patent Document 1 to the arithmetic operation on the ring.

Non-Patent Document 1: Oded Goldreich: The Foundations of Cryptography—Volume 2. pp. 643-645 ISBN 0-521-83084-2 Published in US in May 2004, Publisher: Cambridge University Press

DISCLOSURE OF THE INVENTION

Problems to be Solved by the Invention

The arithmetic operation method according to Non-Patent Document 1 described above has an advantage of being capable of executing an arbitrary calculation in a variant manner based on addition as well as multiplication of bits distributed in two devices. However, in a case where the arithmetic operation method according to Non-Patent Document 1 is employed to an arithmetic operation on a large ring, an arbitrary arithmetic operation on the ring cannot be calculated in a variant manner. Therefore, there is such an issue that the calculation amount required for the arithmetic operation on the ring becomes tremendous.

An object of the present invention is to provide a multi-party distributed multiplication device, a multi-party distributed multiplication system and a method thereof, which execute a calculation of a product of two values used for an arithmetic operation on a ring held at two arithmetic operation devices in a form of the sum in a variant manner by those devices through communicating with each other so that the product can be held by those arithmetic operation devices in a form of the sum in a variant manner.

Means for Solving the Problems

In order to achieve the foregoing object, the multi-party distributed multiplication system according to the present invention is a multi-party distributed multiplication system which identifies legitimacy of a conversation through a mutual communication, and the system is characterized to include:

a first device which includes an initial setting device which generates and discloses a first public key by using an inputted system parameter; and a second device which includes an initial setting device which generates and discloses a second public key by using an inputted system parameter, wherein:

the first device includes a commitment generation device which generates a commitment of a first input value inputted to the first device based on the system parameter and a random number, an encryption device which generates an encrypted text of the first input value based on the system parameter, the random number, and the first public key, an authentication device which generates a certificate that authenticates a range of the first input value based on the system parameter, the random number used for generating the encrypted text, the first public key, and the second public key, a decryption device which generates a decrypted text by decrypting a noisy encrypted text transmitted from the second device based on the system parameter, the first public key, and a private key held by itself, and a noise removal device which generates a product share by removing a noise from the decrypted text; and the second device includes a commitment generation device which generates a commitment of a second input value inputted to the second device based on the system parameter and a random number;

an authentication device which authenticates that a plain text of the encrypted text of the first input value is within the range based on the system parameter, the first public key, the second public key, and the certificate, a share generation device which generates a product share held by itself, and an encrypted text generation device which generates an encrypted text of data acquired by adding the noise to a product of the plain text of the encrypted text of the first input value and the second input value as the noisy product encrypted text based on the encrypted text of the first input value, the second input value, and the product share.

Further, the second multi-party distributed multiplication device according to the present invention is a multi-party distributed multiplication device which includes an input module, an output module, a calculation module, and a communication module. The multi-party distributed multiplication device is characterized to include:

an initial setting device which receives an inputted system parameter and outputs a second public key;

a commitment generation device which generates a commitment of an input value based on the system parameter, the input value, and a second random number;

a device which receives an input value encrypted text and a range certificate;

a range authentication device which authenticates that a plain text of the encrypted text of the input value is within a specific range based on the system parameter, the input value encrypted text, the first public key, the second public key, and the range certificate; and a noisy product encrypted text generation device which generates a noisy product encrypted text that is an encrypted text of data acquired by adding the noise to a product of the plain text of the input value encrypted text and the input value based on the input value encrypted text and the input value.

Further, the multi-party distributed multiplication method according to the present invention is a multi-party distributed multiplication method which identifies legitimacy of a conversation via a mutual communication conducted between a first device and a second device, and the method is characterized to include:

disclosing a first public key from the first device by using a system parameter inputted to the first device, and disclosing a second public key from the second device by using a system parameter inputted to the second device;

processing of generating a commitment of a first input value inputted to the first device based on the system parameter and a random number;

processing of generating an encrypted text of the first input value based on the system parameter, the random number, and the first public key;

processing of generating a certificate that authenticates a range of the first input value based on the system parameter, the random number used for generating the encrypted text, the first public key, and the second public key;

processing of generating a decrypted text by decrypting a noisy encrypted text transmitted from the second device based on the system parameter, the first public key, and a private key held by itself;

processing of generating a product share by removing a noise from the decrypted text;

processing of generating a commitment of a second input value inputted to the second device based on the system parameter and a random number;

processing of authenticating that a plain text of the encrypted text of the first input value is within the range based on the system parameter, the first public key, the second public key, and the certificate;

processing of generating a product share held by itself; and processing of generating an encrypted text of data acquired by adding the noise to a product of the plain text of the encrypted text of the first input value and the second input value as the noisy product encrypted text based on the encrypted text of the first input value, the second input value, and the product share.

Effect of the Invention

The present invention makes it possible to execute a calculation of the product of two values on a ring held at two devices in a form of the sum in a variant manner through those devices by communicating with each other so that the product can be held by those devices in a form of the sum in a variant manner.

BEST MODES FOR CARRYING OUT THE INVENTION

Figure 1:
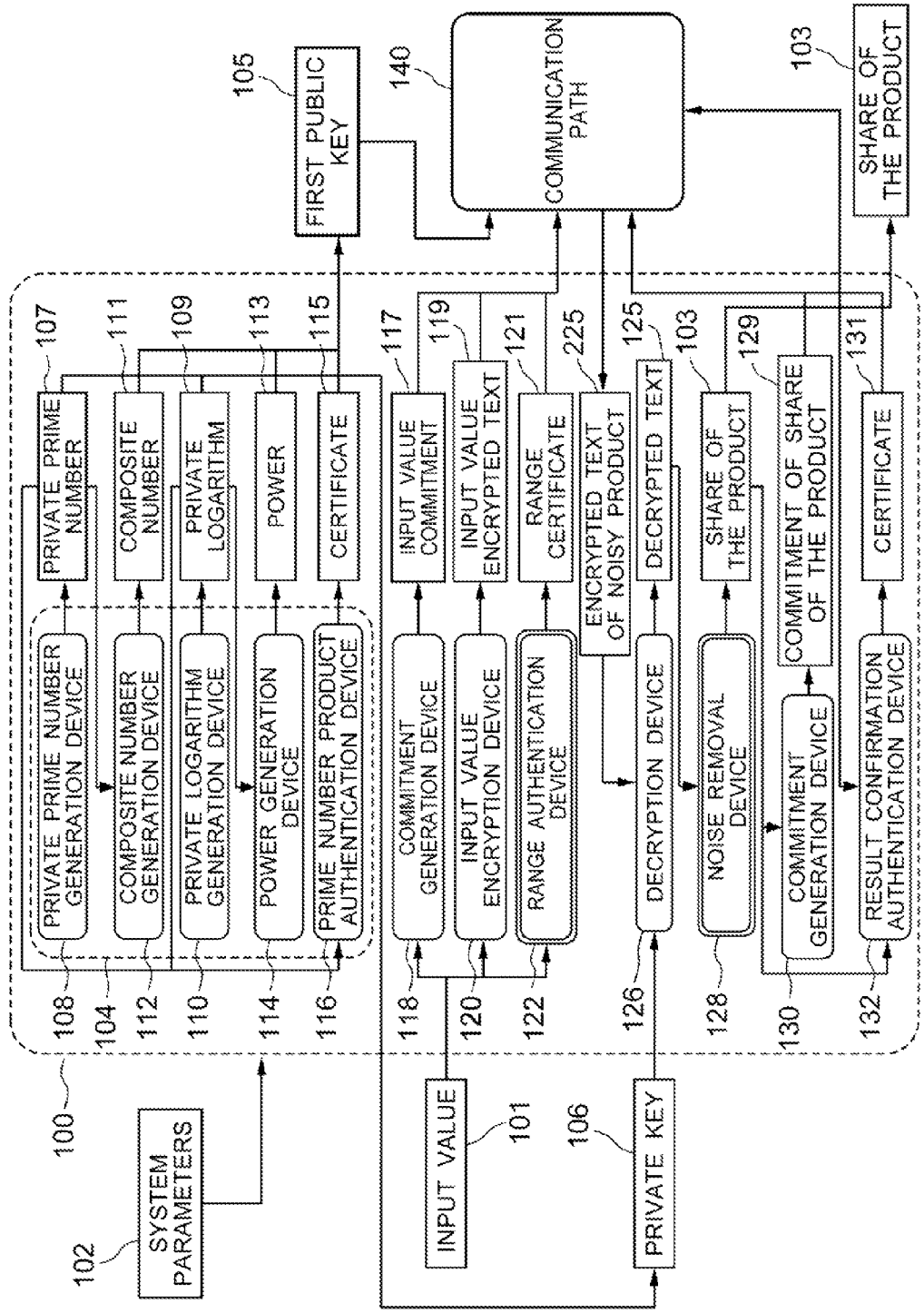
FIG. 1 is an illustration showing the structure of a first device according to an exemplary embodiment of the invention.

Hereinafter, an exemplary embodiment of the invention will be described in details by referring to the drawings.

Figure 2:
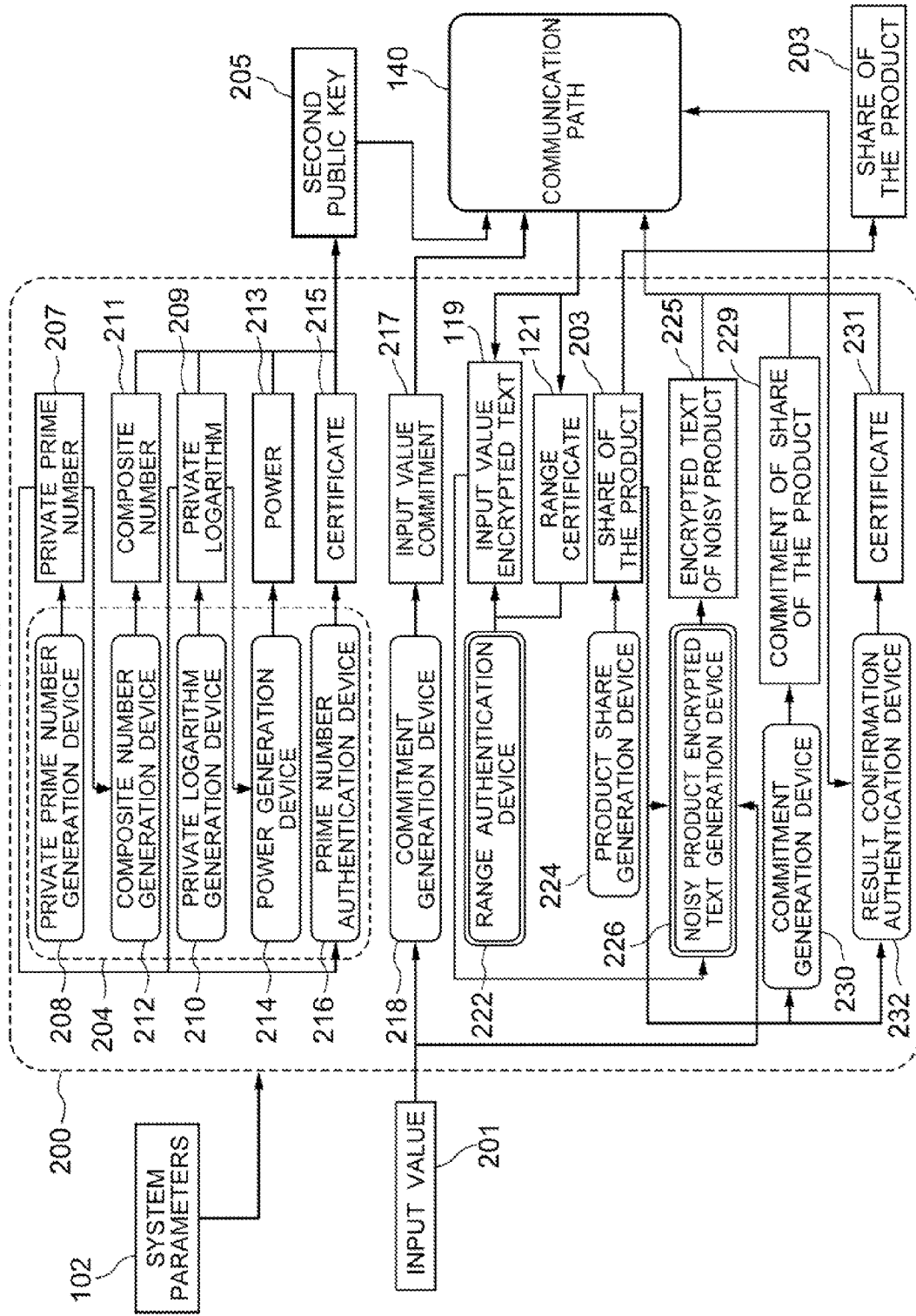
FIG. 2 is an illustration showing the structure of a second device according to the exemplary embodiment of the invention.

A multi-party distributed multiplication system according to the exemplary embodiment of the invention shown in FIG. 1 and FIG. 2 is a system employed to encryption processing in a concealed communication and the like as a way of example thereof. First, each of reference symbols used in the multi-party distributed multiplication system according to the exemplary embodiment of the invention described below will be explained. It is defined that $\kappa$, $\mu$ are safe variables that are positive integers, p is a positive integer of $\kappa$ bits, G is a cyclic group of the order p, and g, h are the origins for generating G. Further, log gh is a discrete logarithm of h to g, and it is assumed that the value thereof is unknown. Hash is a cryptographic Hash function from an arbitrary character string to a character string in length of $\kappa$ bits. The symbols of $\kappa$, $\mu$, p, G and symbols of g, h, Hash are called as system parameters.

The multi-party distributed multiplication system according to the exemplary embodiment of the invention shown in FIG. 1 and FIG. 2 includes a first device 100 shown in FIG. 1 and a second device 200 shown in FIG. 2, which are communicable with each other via a communication path 140.

The first device 100 shown in FIG. 1 includes an initial setting device 104. Further, the first device 100 shown in FIG. 1 includes a commitment generation device 118, an encryption device 120, a range authentication device 122, a decryption device 126, a noise removal device 128, a commitment generation device 130, and a result confirmation authentication device 132.

The initial setting device 104 discloses a first public key 105 on the communication path 140 based on the system parameters inputted to the first device 100, and the initial setting device 104 includes a private prime number generation device 108, a composite number generation device 112, a private logarithm generation device 110, a power generation device 114, and a prime number authentication device 116.

The private prime number generation device 108 randomly generates private prime numbers 107 that are two safe prime numbers larger than $2\kappa+\mu$ based on system parameters 102 inputted to the first device 100. The private prime numbers 107 as the two safe prime numbers are expressed as $p[1]$ and $q[1]$. Further, the private logarithm generation device 110 randomly generates a private logarithm 109 based on the system parameters 102 inputted to the first device 100. The private logarithm 109 is expressed as $x[1]$. Furthermore, the private logarithm $x[1]$ is in a relation of $x[1] \in Z/pZ$.

The composite number generation device 112 generates a composite number 111 based on the private prime numbers $p[1]$ and $q[1]$ (107) generated by the private prime number generation device 108. The composite number 111 is expressed as $n[1]$. Further, the composite number $n[1]$ is in a relation of $n[1]=p[1]q[1]$. The expression $p[1]q[1]$ shows that it is a product of $p[1]$ and $q[1]$ mentioned above.

The power generation device 114 generates a power 113 based on the private logarithm $x[1]$ (109) generated by the private logarithm generation device 110. The power 113 is expressed as $y[1]$. The power $y[1]$ is in a relation of $y[1]=g^{x[1]}$.

The prime number product authentication device 116 generates a certificate 115 based on the private prime numbers $p[1]$ and $q[1]$ generated by the private prime number generation device 108. The certificate 115 shows that the composite number $n[1]$ is $p[1]q[1]$ which is the product of the private prime numbers $p[1]$ and $q[1]$ that are the two safe prime numbers larger than $(2\kappa+\mu)$.

The initial setting device 104 adds information of $e[1]$ in addition to the composite number $n[1]$ generated by the composite number generation device 112, the power $y[1]$ generated by the power generation device 114, and the certificate 115 generated by the prime number product authentication device 116, and discloses those on the communication path 140 as the first public key 105. Therefore, the first public key 105 is configured with the composite number $n[1]$, the power $y[1]$, the certificate 115, and $e[1]$ mentioned above.

The structure described above is for disclosing the first public key 105 on the communication path 140. Next, a structure for encrypting a plain text of an input value 101 by using the first public key 105 will be described.

The commitment generation device 118 generates a commitment 117 of the input value 101 inputted to the first device 100 based on the system parameters and a random number. The commitment 117 is expressed as $c[1]$. The commitment $c[1]$ is in a relation of $c[1]=g^{s[1]}h^{u[1]}$. The expression $g^{s[1]}h^{u[1]}$ shows that it is a product of $g^{s[1]}$ and $h^{u[1]}$. Further, $s[1]$ shows the input value 101, and $u[1]$ shows the random number to be described later.

The encryption deice 120 encrypts the input value 101 by using the system parameters, a third random number $r[1]$ selected randomly, and the first public key 105, and transmits an input value encrypted text 119 acquired thereby to the second device 200 via the communication path 140. The input value encrypted text 119 is expressed as $d=e[1]^{s[1]}r[1]^{n[1]}$. The input value encrypted text 119 is shown as a product of $e[1]$, the input value $s[1]$, the random number $r[1]$, and the composite number $n[1]$ contained in the public key 105.

The range authentication device 122 creates a certificate 121 for certifying the size (range) of an encrypted plain text out of the input value encrypted text 119 created by the encryption device 120 based on the system parameters, the random number for generating the encrypted text, the first key 105, and the second public key 205. The plain text of the input value encrypted text 119 corresponds to the input value 101 inputted to the first device 100, and the plain text is expressed as $s[1]$.

Next, a structure which decrypts an encrypted text encrypted by the second device 200 and transmitted to the first device 100 via the communication path 140 will be described.

The decryption device 126 generates a decrypted text by decrypting the encrypted text containing a noise transmitted from the second device based on the system parameters, the first public key 105, and a private key 106 held by the decryption device 126 itself. When acquiring the decrypted text 125, the decryption device 126 decrypts the encrypted text 225 by using the private key 106. The private key 106 contains the private prime numbers $p[1]$ and $q[1]$ generated by the private prime number generation device 108 and the private logarithm $x[1]$ generated by the private logarithm generation device 110. Further, the encrypted text 225 encrypted by the second device 200 contains a noise.

The noise removal device 128 removes the noise contained in the decrypted text 125 decrypted by the decryption device 126, and outputs a product share 103 from which the noise is removed.

The commitment generation device 130 generates a commitment 129 for the product share 103 by receiving the product share 103 outputted from the noise removal device 128 as an input.

The result confirmation authentication device 132 confirms that the product of the input value $s[1]$ to the first device 100 and the input value $s[2]$ to the second device 200 is the sum of a product share $t[1]$ held by the first device 100 and a product share $t[2]$ held by the second device 200, and discloses a certificate 131 on the communication path 140 for authenticating the confirmed fact to a third party.

Next, the structure of the second device 200 which communicates with the first device 100 via the communication path 140 will be described.

The second device 200 shown in FIG. 2 includes an initial setting device 204. Further, the second device 200 shown in FIG. 2 includes a commitment generation device 218, a product share generation device 224, a commitment generation device 230, a result confirmation authentication device 232, and a range authentication device 222.

The initial setting device 204 discloses the second public key 205 on the communication path 140 based on the system parameters inputted to the second device 200, and the initial setting device 204 includes a private prime number generation device 208, a composite number generation device 212, a private logarithm generation device 210, a power generation device 214, and a prime number product authentication device 216.

The private prime number generation device 208 randomly generates private prime numbers 207 that are two safe prime numbers larger than $2\kappa+\mu$ based on the system parameters 102 inputted to the second device 200. The private prime numbers 207 as the two safe prime numbers are expressed as $p[2]$ and $q[2]$. Further, the private logarithm generation device 210 randomly generates a private logarithm 209 based on the system parameters 102 inputted to the second device

200. The private logarithm 209 is expressed as x[2]. Furthermore, the private logarithm x[2] is in a relation of x[2]∈Z/pZ.

The composite number generation device 212 generates a composite number 211 based on the private prime numbers p[2] and q[2] (207) generated by the private prime number generation device 208. The composite number 211 is expressed as n[2]. Further, the composite number n[2] is in a relation of n[2]=p[2]q[2]. The expression p[2]q[2] shows that it is a product of p[2] and q[2] mentioned above.

The power generation device 214 generates a power 213 based on the private logarithm x[2] (209) generated by the private logarithm generation device 210. The power 213 is expressed as y[2]. The power y[2] is in a relation of $y[2]=g^{x[2]}$.

The prime number product authentication device 216 generates a certificate 215 based on the private prime numbers p[2] and q[2] generated by the private prime number generation device 208. The certificate 215 shows that the composite number n[2] is p[2]q[2] which is the product of the private prime numbers p[2] and q[2] that are the two safe prime numbers larger than (2κ+μ).

The initial setting device 204 adds information of η[12] and η[22]∈Z/n[2]²Z in addition to the composite number n[2] generated by the composite number generation device 212, the power y[2] generated by the power generation device 214, and the certificate 215 generated by the prime number product authentication device 216, and discloses those on the communication path 140 as the second public key 205. Therefore, the second public key 205 is configured with the composite number n[2], the power y[2], the certificate 215, η[12], and η[22] mentioned above.

The structure described above is for disclosing the second public key 205 on the communication path 140. Next, a structure for encrypting a plain text of an input value 201 by using the second public key 205 will be described.

The commitment generation device 218 generates a commitment 217 of the input value 201 inputted to the second device 200. The commitment 217 is expressed as c[2]. The commitment c[2] is in a relation of $c[2]=g^{s[2]}h^{u[2]}$. The expression $g^{s[2]}h^{u[2]}$ shows that it is a product of $g^{s[2]}$ and $h^{u[2]}$. Further, s[2] shows the input value 201, and u[2] shows the random number to be described later.

The range authentication device 222 authenticates that the plain text of the encrypted text of the first input value is within the range based on the system parameters, the first public key 105, the second public key 205, and the certificate 121. In other words, the range authentication device 222 authenticates the certificate 121 of the range that shows the range of the size of the encrypted plain text out of the input value encrypted text 119 inputted to the second device 200 by calculating the Hash function (α=Hash).

The product share generation device 224 generates a product share 203 held by the second device 200. The noisy product encrypted text generation device 226 generates, as the noisy product encrypted text, a data encrypted text acquired by adding the noise to the product of the plain text of the first input value encrypted text and the second input value based on the first input value encrypted text 119, the second input value 201, and the product share 203. In other words, the noisy product encrypted text generation device 226 receives the product share 203 generated by the product share generation device 224 and the input value 201 inputted to the second device 200 as an input, generates the noisy product encrypted text 225 by applying encryption processing on the input value 201, and transmits the product encrypted text 225 to the first device 100 via the communication path 140.

The commitment generation device 230 generates a commitment 229 for the product share 203 by receiving the product share 203 outputted by the product share generation device 224 as an input.

The result confirmation authentication device 232 confirms that the product of the input value s[2] to the second device 200 and the input value s[1] to the first device 100 is the sum of the product share t[1] held by the first device 100 and the product share t[2] held by the second device 200, and discloses a certificate 231 on the communication path 140 for authenticating the confirmed fact to a third party.

The multi-party distributed multiplication system according to the exemplary embodiment of the invention is designed by assuming that the first device 100 shown in FIG. 1 holds the input value s[1] (101) and the second device 200 shown in FIG. 2 holds the input value s[2] (201). Further, the multi-party distributed multiplication system according to the exemplary embodiment of the invention is capable of authenticating that the communication (conversation) made between the first device 100 and the second device 200 is legitimate, when the devices communicate with each other via the communication path 140 under that presupposition and the first device 100 and the second device 200 come to hold the product shares t[1] (103) and t[2] (203) to be the sum that is equivalent to the product of the input values s[1] and s[2] as a result of the communication. The relation between the product of the input values s[1] and s[2] and the sum of the shares t[1] (103) and t[2] (203) is expressed as s[1]s[2]=t[1] (103)+t[2] (203).

Figure 3:
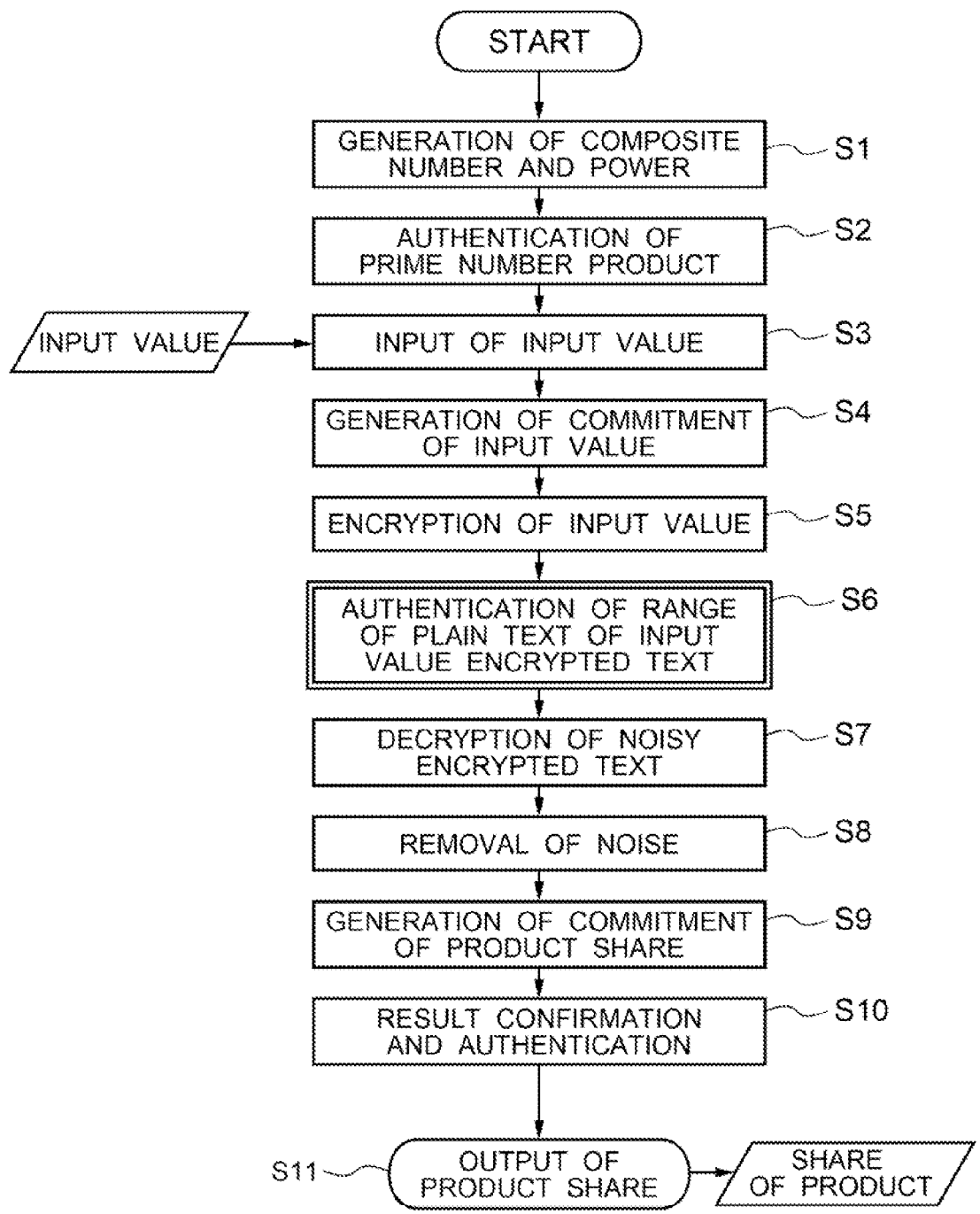
FIG. 3 is a chart showing a flow of processing of the first device according to the exemplary embodiment of the invention.

Hereinafter, the actions of the multi-party distributed multiplication system according to the exemplary embodiment of the invention shown in FIG. 1 and FIG. 2 will be described in details by referring to FIG. 3 and FIG. 4. FIG. 3 is a flowchart showing the actions of the first device 100 shown in FIG. 1, and FIG. 4 is a flowchart showing the actions of the second device 200 shown in FIG. 2.

Figure 4:
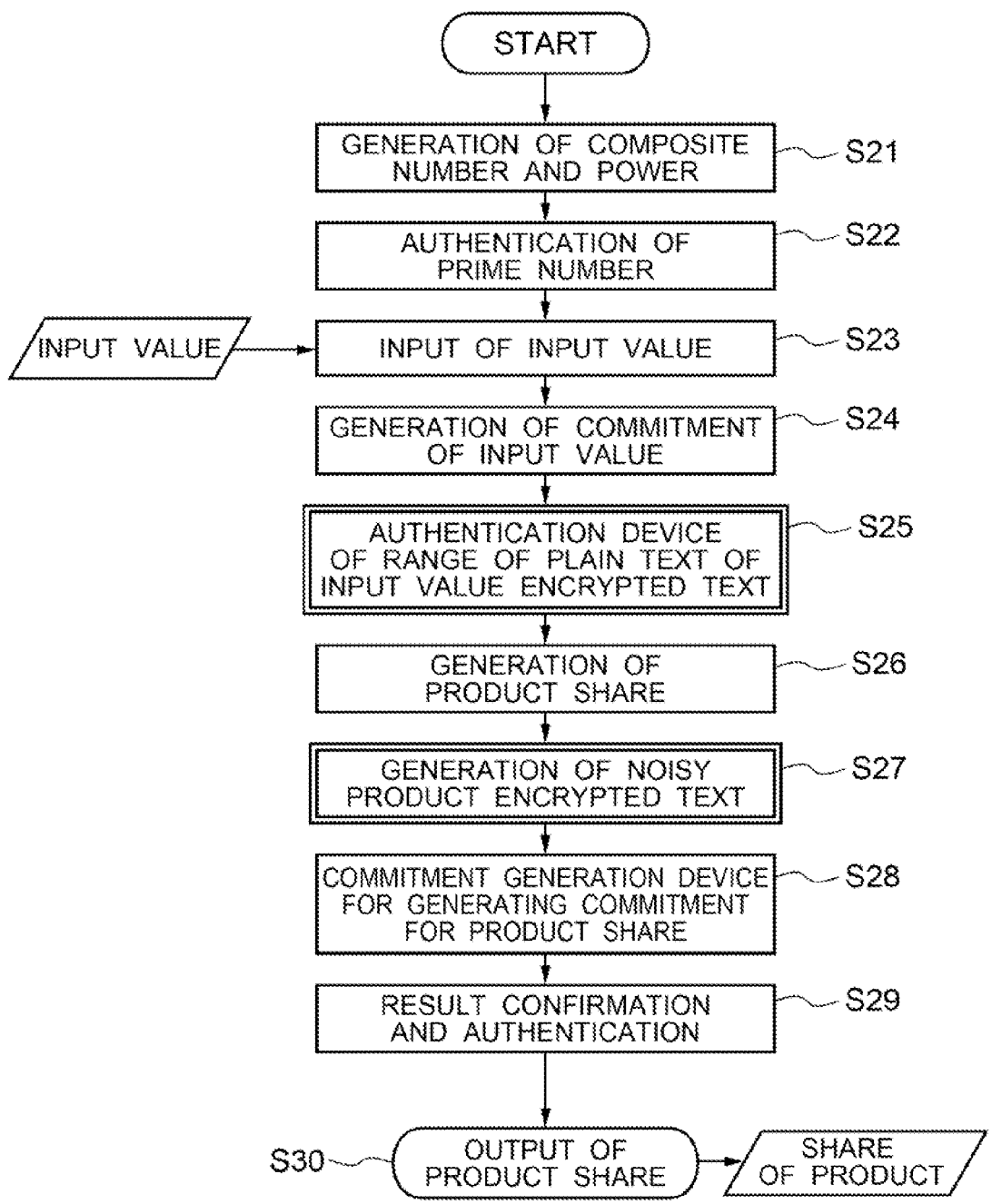
FIG. 4 is a chart showing a flow of processing of the second device according to the exemplary embodiment of the invention.

As shown in FIG. 3 and FIG. 4, the initial setting device 104 of the first device 100 and the initial setting device 204 of the second device 200 output the public keys 105 and 205, respectively, as a procedure for the initial setting. Hereinafter, the actions of outputting the respective public keys 105 and 205 will be described in a specific manner.

The system parameters 102 are inputted to the first device 100 and the second device 200.

The private prime number generation device 108 of the first device 100 randomly generates the private prime numbers p[1] and q[1] (107) that are two safe prime numbers larger than 2κ+μ based on the system parameters 102. Similarly, the private prime number generation device 208 of the second device 200 randomly generates the private prime numbers p[2] and q[2] (207) that are two safe prime numbers larger than 2κ+μ based on the system parameters 102.

The private logarithm generation device 110 of the first device 100 randomly generates the private logarithm x[1] (109) based on the system parameters 102. The private logarithm x[1] is in a relation of x[1]∈Z/pZ.

The private logarithm generation device 210 of the second device 200 randomly generates the private logarithm x[2] (209) based on the system parameters 102. The private logarithm x[2] is in a relation of x[2]∈Z/pZ.

The composite number generation device 112 of the first device 100 generates the composite number n[1] (111) based on the private prime numbers p[1]q[1] (107) generated by the private prime number generation device 108. The composite number n[1] is in a relation of n[1]=p[1]q[1].

The composite number generation device 212 of the second device 200 generates the composite number n[2] (211)

based on the private prime numbers p[2]q[2] (207) generated by the private prime number generation device 208. The composite number n[2] is in a relation of n[2]=p[2]q[2].

The power generation device 114 of the first device 100 generates the power y[1] (113) based on the private logarithm x[1] (109) generated by the private logarithm generation device 110. The power y[1] is in a relation of y[1]=$g^{x[1]}$.

The power generation device 214 of the second device 200 generates the power y[2] (213) based on the private logarithm x[2] (209) generated by the private logarithm generation device 210. The power y[2] is in a relation of y[2]=$g^{x[2]}$.

The processing performed by the private prime number generation devices 108, 109, the composite number generation devices 112, 212, the private logarithm number generation devices 110, 210, and the power generation devices 114, 214 described above is executed in a step S1 of FIG. 3 and a step S21 of FIG. 4.

Further, the prime number product authentication device 116 of the first device 100 generates the certificate 115 that authenticates that the composite number n[1] is the product of two safe prime numbers (p[1], q[1]) that are larger than 2κ+μ based on the private prime numbers p[1] and q[1] generated by the private prime number generation device 108.

The prime number product authentication device 216 of the second device 200 generates the certificate 215 that authenticates that the composite number n[2] is the product of two safe prime numbers (p[2], q[2]) that are larger than 2κ+μ based on the private prime numbers p[2] and q[2] generated by the private prime number generation device 208.

The processing performed by the prime number product authentication devices 116 and 216 described above is executed in a step S2 of FIG. 3 and a step S22 of FIG. 4.

Then, the first device 100 adds information of e[1] in addition to the composite number n[1] (111), the power y[1] (113), and the certificate 115 when generating each of the private prime number 107, the composite number III, the private logarithm 109, the power 113, and the certificate 115, and discloses those on the communication path 140 as the first public key 105.

Similarly, the initial setting device 204 adds information of η[12] and η[22]∈Z/n[2]$^2$Z in addition to the composite number n[2] (207), the power y[2] (213), and the certificate 215 when generating each of the private prime number 207, the composite number 211, the private logarithm 209, the power 213, and the certificate 215, and discloses those on the communication path 140 as the second public key 205.

Hereinafter, it is so defined that γ[1]=η[12]$^2$ and γ[2]=η[22]$^2$. The first public key 105 outputted from the first device 100 contains n[1], y[1], the certificate, and e[1]. The second public key 205 outputted from the second device 200 contains n[2], y[2], the certificate, η[12], and η[22]. Further, while the first device 100 has the private key 106 containing p[1], q[1], and x[1], the second device 200 does not have such private key unlike the case of the first device 100.

The processing described above is the processing that does not use the input values s[1] and s[2]. Therefore, the information of the private prime numbers 107, 207, the composite numbers 111, 211, the private logarithms 109, 209, the powers 113, 213, and the certificates 115, 215 which are generated in the above described process can be utilized any number of times even when the input values s[1] and s[2] are changed.

When the initialization setting done by the initial setting devices 104 and 204 described above (step S3 of FIG. 3, step S23 of FIG. 4) is completed, processing for generating a commitment is executed (step S4 of FIG. 3, step S24 of FIG. 4). This will be described in a specific manner.

The input value s[1] of s[1]∈Z/pZ is inputted to the commitment generation device 118 of the first device 100 as the input value 101, and the input value s[2] of s[2]∈Z/pZ is inputted to the commitment generation device 218 of the second device 200 as the input value 201.

The commitment device 118 of the first device 100 generates a first random number u[1]∈Z/pZ, and generates a commitment (c[1]) 117 of the input value s[1] based on the random number u[1] (step S4 of FIG. 3). The commitment 117 is in a relation of c[1]=$g^{s[1]}h^{u[1]}$. Similarly, the commitment device 218 of the second device 200 generates a second random number u[2]∈Z/pZ, and generates a commitment (c[2]) 217 of the input value s[2] based on the random number u[2]. The commitment 217 is in a relation of c[2]=$g^{s[2]}h^{u[2]}$.

Thereby, the commitment (c[1]=$g^{s[1]}h^{u[1]}$) 117 of the input value is disclosed on the communication path 140 from the commitment generation device 118. Similarly, the commitment (c[2]=$g^{s[1]}h^{2[2]}$) 217 of the input value is disclosed on the communication path 140 from the commitment generation device 218.

After the processing from step S4 of FIG. 3 to step S24 of FIG. 4 described above is executed, processing for calculating product shares t[1] (103) and t[2] (203) is executed. When the first device 100 and the second device 200 communicate with each other legitimately, the relation between the product of the input values s[1] and s[2] and the sum of the shares t[1] (103) and t[2] (203) is to satisfy s[1]s[2]=t[1] (103)+t[2] (203). This will be described in a specific manner.

When the input value 101 is inputted, the encryption device 120 of the first device 100 randomly selects the third random number r[1]∈Z/n[1]$^2$Z, and encrypts the input value 101 by using the random number r[1]. The encrypted text 119 that is the encryption of the input value 101 is in a relation of d=e[1]$^{s[1]}$r[1]$^{n[1]}$, when the encrypted text 119 is expressed as d.

The authentication device 122 of the first device 100 generates the certificate 121 which shows the size (range) of the plain text (input value s[1] (101)) contained in the encrypted text (d) 119 (step S6 of FIG. 3). The authentication device 122 discloses the certificate 121 on the communication path 140.

When the encryption device 120 transmits the input value encrypted text 119 to the second device 200 via the communication path 140, the second device authenticates the range certificate 121 by using the authentication device 222. This will be described in a specific manner.

The range authentication device 122 of the first device 100 randomly generates ρ∈[0,1]$^{|n[2]|+\mu}$, δ=γ[1]$^{s[1]}$γ[2]$^\mu$. Then, the range authentication device 122 generates a certificate which certifies the knowledge of s, ρ∈E Z, r∈Z/n[1]$^2$Z, and u∈Z/pZ, which satisfy δ=γ[1]$^s$γ[2]$^\mu$, $-2^{2\kappa+\mu+1}<s<2^{2\kappa+\mu+1}$, d=e[1]$^s$r$^{n[1]}$, and c[1]=$g^s h^u$ with a statistical zero-knowledge proof method in a following manner.

That is, the range authentication device 122 randomly selects 0≦s'<$2^{2\kappa+\mu}$, ρ'∈[0,1]$^{|n[2]|+\kappa+2\,\mu}$, r'∈Z/n[1]$^2$Z, and u'∈Z/pZ, generates δ'=γ[1]$^{s'}$γ[2]$^{\rho'}$, d'=e[1]$^{s'}$r'$^{n[1]}$, c'=$g^{s'}h^{u'}$, and generates α=Hash (κ, μ, p, g, h, n__1, n[2], e[1], δ, d, c[1], δ', d', c').

Further, the range authentication device 122 calculates s"=s[1]c+s' (on Z), ρ"=ρc+ρ' (on Z). r"=r$^c$r', and u"=uc+u'.

Then, the range authentication device 122 transmits the range certificate 121 to the second device 200 via the communication path 140. The certificate 121 contains (δ, δ', d', c', s", ρ", r", u").

When the second device 200 receives the encrypted text 119 and the certificate 121, the range authentication device 222 calculates α=Hash (κ, μ, p, g, h, n__1, n[2], e[1], δ, d, c[1], δ', d', c') and checks that δ$^c$δ'=γ[1]$^{s''}$γ[2]$^{\rho''}$, $-2^{2\kappa+\mu+1}<s"<2^{2\kappa+\mu+1}$, $d^c d' = e[1]'' r'''$, and $c[1]^c c' = g^{s''} h^{u''}$ apply so as to authenticate the range certificate 121 (step S25 of FIG. 4).

The product share generation device 224 of the second device 200 randomly selects the product share t[2] in addition to a noise $0 < m < 2^{2\kappa+2}\mu$ and the random number $r[2] \in Z/n[1]^2$, and generates the product share (203) $t[2] \in Z/pZ$ (step S26 of FIG. 4).

Then, the encrypted text generation device 226 generates the noisy product encrypted text 225 based on the inputted encrypted text 119 by acquiring the product share data in addition to the noise and random number outputted by the product share generation device 224 (step S27 of FIG. 4).

Provided that the encrypted text 225 generated by the encrypted text generation device 226 is b, it can be expressed by a following expression.

$$b = d^{s[2]} e[1]^{pm-t[2]} r[2]^{n[1]}$$

The encrypted text generation device 226 transmits the encrypted text 225 to the first device 100 via the communication path 140.

Upon receiving the encrypted text 225, the decryption device 126 of the first device 100 decrypts the cryptograph expressed by b mentioned above as Paillier cryptosystem by using the private key 106 to acquire the decrypted text 125 ($t'[2] \in Z/n[1]Z$) from the encrypted text 225. As described above, the private key 106 contains p[1], q[1], and x[1].

The decryption device 126 acquires the decrypted text 125 as $t'[1] = L(b\lambda)/L(e[1]\lambda)$ by using expressions for decryption, $\lambda = 1$ cm(p[1], q[1] and $L: Z/n[1]^2 Z \to Z/n[1]Z$; $c \to (c\lambda - 1)/n[1]$ mod n[1] (step S7 of FIG. 3).

Upon receiving the decrypted text 125, the noise removal device 128 removes the noise from the decrypted text 125 to acquire the product share 103 ($t[1] \in Z/pZ$) (step S8 of FIG. 3). Provided that the product share 103 is expressed as t[1], it can be expressed as $t[1] = t'[1] \mod p$.

Through the above-described processing, the relation regarding t[1] that is the product share 103 held by the first device, t[2] that is the product share 203 held by the second device 200, the input value s[1] of the first device 100, and the input value s[2] of the second device 200 ought to become $t[1]+t[2] = s[1]s[2]$, when the first device 100 and the second device 200 conduct a legitimate communication without taking any impersonating actions.

Next, described is a case of executing processing for checking whether or not the above-described expression is satisfied.

The commitment generation device 130 of the first device 100 receives the product share 103, randomly generates $v[1] \in Z/pZ$, generates the product share commitment 129 ($a[1] = g^{t[1]} h^{v[1]}$) (step S9 of FIG. 3), and discloses the commitment 129 on the communication path 140.

Similarly, the commitment generation device 230 of the second device 200 receives the product share 203, randomly generates $v[2] \in Z/pZ$, generates the product share commitment 229 ($a[2] = g^{t[2]} h^{v[2]}$) (step S28 of FIG. 4), and discloses the commitment 229 on the communication path 140.

Then, the first device 100 and the second device 200 confirm $t[1]+t[2] = s[1]s[2]$ according to a following procedure by using the result confirmation authentication devices 132 and 232, respectively. Further, the first device 100 and the second device 200 output the certificates 131 and 231 to a third party for authenticating that fact. This output is a combination of all the certificates outputted by the following procedure.

It is assumed that $y = y[1]y[2]$. That is, regarding $i = 1, 2$, the i-th device knows $x[i] \in Z/pZ$ that satisfies $y[i] = g^{x[i]}$. The result confirmation authentication device 232 of the second device randomly selects $w[2] \in Z/pZ$, calculates $(g'[2], y'[2]) = (g^{w[2]}, g^{x[2]} y^{w[2]})$, and discloses it on the communication path 140.

Then, the result confirmation authentication device 232 authenticates the knowledge of w[2], s[2], and u[2] which satisfy $(g'[2], y'[2]) = (g^{w[2]}, g^{s[2]} y^{w[2]})$, $c[2] = g^{s[2]} h^{u[2]}$) with the zero-knowledge proof method.

The result confirmation authentication device 132 of the first device calculates $(g'[1], y'[1]) = (g'[2]^{s[1]} g^{w[1]}, y'[2]^{s[1]} y^{w[1]})$, and discloses it on the communication path 140.

Then, the result confirmation authentication device 132 outputs a certificate that authenticates the knowledge of w[1], s[1], and u[1] which satisfy $(g'[1], y'[1]) = (g'[2]^{s[1]}, g^{w[1]}, y'[2]^{s[1]} y^{w[1]})$ and $c[1] = g^{s[1]} h^{u[1]}$ with the zero-knowledge proof method on the communication path 140.

Note here that (g'[1], y'[1]) is an ElGamal encrypted text by using the public key (g, y) of $g^{s[1]s[2]}$.

Regarding each $i = 1, 2$, the result confirmation authentication device 132 of the first device randomly selects $z[i] \in Z/pZ$, generates $(g''[i], y''[i]) = (g^{z[i]}, g^{t[i]} y^{z[i]})$ and outputs a certificate that authenticates the knowledge of t[i], z[i], and v[i] which satisfy $(g''[i], y''[i]) = (g^{z[i]}, g^{t[i]} y^{z[i]})$, and $a[i] = g^{t[i]} h^{v[i]}$ with the zero-knowledge proof method.

It is so defined that $(g'', y'') = (g''[1]g''[2], y''[1]y''[2])$, and $(g'', y'')$ is an ElGamal encrypted text by using the public key (g, y) of $g^{t[1]+t[2]}$.

The result confirmation authentication device 132 of the first device randomly selects $\theta[1] \in Z/pZ$, generates $(g[3], y[3]) = ((g''/g'[2])^{\theta[1]}, (y''/y'[2])^{\theta[1]})$, and outputs a certificate which authenticates the knowledge of $\theta[1]$ with the zero-knowledge proof method on the communication path 140.

The result confirmation authentication device 232 of the second device randomly selects $\theta[2] \in Z/pZ$, generates $(g[4], y[4]) = ((g[3])^{\theta[2]}, y[3])^{\theta[2]})$, and outputs a certificate which authenticates the knowledge of $\theta[2]$ with the zero-knowledge proof method on the communication path 140.

The first device and the second device cooperate to perform verifiable decryption of (g[4], y[4]), and confirm that the decryption result is 1. If not, either the first device or the second device is conducting an illegitimate action.

In a case where there is an illegitimate action taken by the i-th device regarding any of $i = 1, 2$, the illegitimate one is specified by a following manner.

The result confirmation authentication device 232 of the second device authenticates that the product share (b) 103 is generated properly. That is, the result confirmation authentication device 232 outputs a certificate which authenticates the knowledge of $t \in Z$, $r \in Z/n[1]^2 Z$, s, u, $v \in Z/pZ$ which satisfy $b = d^s e[1]^t r^n$, $c[2] = g^s h^u$, $a[2] = g^{-t} h^v$, $0 < t < 2^{2\kappa + \mu + 1}$ with the zero-knowledge proof method on the communication path 140.

When the illegitimate action of the second device is not found by the above method, it is considered that the first device is doing an illegitimate work.

With each of the exemplary embodiments described above, it is possible to calculate the product of the two values on a ring held at the two devices in a form of the sum in a variant manner with the two devices by communicating with each other so that the product can be held at those devices in a form of the sum in a variant manner.

It is evident that it is easy to calculate the sum of the two values on a ring held at the two devices in a form of the sum in a variant manner with the two devices by communicating with each other so that the sum can be held at those devices in a form of the sum in a variant manner. Therefore, in combination with this method, it is possible to execute an arbitrary arithmetic operation on the ring in a variant manner.

Further, calculations according to the present invention are not done by each bit in each device but done collectively on a large ring. Thus, it is extremely effective.

The calculation on the ring is an arithmetic operation used often in calculations of encryption, private share, and coding, so that it can be utilized broadly in those fields.

Each of the embodiments described above is merely presented as the preferable embodiment of the present invention, and various modifications are possible within the scope of the present invention. For example, processing for achieving the functions of the device may be executed by causing the device to load a program for achieving the functions of the multi-party distributed multiplication device. Further, the program may be transmitted to other computers system via CD-ROMs, magneto-optical disks, or the like, which are recording media that can be read by computers, or via the Internet, telephone lines, or the like as transmission media by the transmission wave. Furthermore, a form with which the functions of the device are achieved collectively by another device and a form with which the functions are achieved in a variant manner by additional devices are also within the scope of the present invention.

INDUSTRIAL APPLICABILITY

The present invention can prevent impersonation when information is exchanged via a communication, so that it is possible to contribute to eliminating illegitimate information communications.

This Application claims the Priority right based on Japanese Patent Application No. 2008-260509 filed on Oct. 7, 2008 and the disclosure thereof is hereby incorporated by reference in its entirety.

REFERENCE NUMERALS

100 First device
104 Initial setting device
108 Private prime number generation device
110 Private logarithm generation device
112 Composite number generation device
114 Power generation device
116 Prime number product authentication device
118 Commitment generation device
120 Input value encryption device
122 Range authentication device
126 Decryption device
128 Noise removal device
130 Commitment generation device
132 Result confirmation authentication device
140 Communication path
200 Second device
204 Initial setting device
208 Private prime number generation device
210 Private logarithm generation device
212 Composite number generation device
214 Power generation device
216 Prime number product authentication device
218 Commitment generation device
222 Range authentication device
224 Product share generation device
226 Noisy product encrypted text generation device
230 Commitment generation device
232 Result confirmation authentication device

The invention claimed is:

1. A multi-party distributed multiplication system which identifies legitimacy of a conversation through a mutual communication, comprising:
a first device which comprises a first initial setting device which generates and discloses a first public key by using an input system parameter; and
a second device which comprises a second initial setting device which generates and discloses a second public key by using the input system parameter, wherein:
the first device includes
a first commitment generation device which generates a first commitment of a first input value input to the first device based on the input system parameter and a first random number,
an encryption device which generates a first encrypted text of the first input value based on the input system parameter, the first random number, and the first public key,
a first authentication device which generates a first certificate that authenticates a range of the first input value based on the input system parameter, the first random number used for generating the first encrypted text, the first public key, and the second public key,
a decryption device which generates a decrypted text by decrypting a noisy encrypted text transmitted from the second device based on the input system parameter, the first public key, and a private key held in the decryption device, and
a noise removal device which generates a first product share of the first device by removing a noise from the decrypted text, and
a first result confirmation authentication device which confirms that a sum of the first product share of the first device and a second product share held by the second device is a product of the first input value and a second input value input to the second device, which is contained in a decrypted text generated by the decryption device; and
the second device includes
a second commitment generation device which generates a second commitment of the second input value input to the second device based on the input system parameter and a second random number;
a second authentication device which authenticates that a plain text of the first encrypted text of the first input value is within the range based on the input system parameter, the first public key, the second public key, and the first certificate,
a share generation device which generates the second product share of the second device,
an encrypted text generation device which generates a second encrypted text of data acquired by adding the noise to a product of the plain text of the first encrypted text of the first input value and the second input value as the noisy product encrypted text based on the first encrypted text of the first input value, the second input value, and the second product share, and
a second result confirmation authentication device which confirms that the sum of the second product share of the second device generated by the share generation device and the first product share held by the first device is the product of the first input value and the second input value.

2. The multi-party distributed multiplication system as claimed in claim 1, wherein
the first device applies the confirmation processing performed by the result confirmation authentication device to encryption processing confirming whether or not there is an illegitimate action taken in a communication conducted with the second device.

3. The multi-party distributed multiplication system as claimed in claim 1, wherein
the second device applies the confirmation processing performed by the result confirmation authentication device to encryption processing confirming whether or not there is an illegitimate action taken in a communication conducted with the first device.

4. A multi-party distributed multiplication device used in a multi-party distributed multiplication system which identifies legitimacy of a conversation between a first device and a second device via a mutual communication of the devices, the multi-party distributed multiplication device comprising:
an initial setting device which generates and discloses a first public key by using an input system parameter;
a commitment generation device which generates a commitment of a first input value input to the first device based on the input system parameter and a random number;
an encryption device which generates an encrypted text of the first input value based on the system parameter, the random number, and the first public key,
an authentication device which generates a certificate that authenticates a range of the first input value based on the system parameter, the random number used for generating the encrypted text, the first public key, and a second public key disclosed by the second device;
a decryption device which generates a decrypted text by decrypting a noisy encrypted text transmitted from the second device based on the system parameter, the first public key, and a private key held by the decryption device;
a noise removal device which generates a product share of the first device by removing a noise from the decrypted text, and
a result confirmation authentication device which confirms that a sum of the product share of the first device and a product share held by the second device is a product of the first input value and a second input value input to the second device, which is contained in a decrypted text generated by the decryption device.

5. A multi-party distributed multiplication device used in a multi-party distributed multiplication system which identifies legitimacy of a conversation between a first device and a second device via a mutual communication of the devices, the multi-party distributed multiplication device comprising:
an initial setting device which generates and discloses a first public key by using an input system parameter;
a commitment generation device which generates a commitment of a first input value input to the second device based on the system parameter and a random number;
an authentication device which authenticates that a plain text of an encrypted text of a second input value input in the first device is within the range based on the system parameter, a second public key disclosed by the first device, the first public key, and a certificate from the first device;
a share generation device which generates a product share held by the second device;
an encrypted text generation device which generates a noisy product encrypted text of data acquired by adding a noise to a product of the plain text of the encrypted text of the second input value and the first input value based on the encrypted text of the second input value, the first input value, and the product share of the second device; and
a result confirmation authentication device which confirms that a sum of the product share of the second device generated by the share generation device and a product share held by the first device is a product of the first input value and the second input value.

6. A multi-party distributed multiplication method which identifies legitimacy of a conversation via a mutual communication conducted between a first device and a second device, the method comprising:
disclosing a first public key from the first device by using a system parameter input to the first device, and disclosing a second public key from the second device by using the system parameter input to the second device; wherein
the first device performs the method comprising:
generating a commitment of a first input value input to the first device based on the system parameter and a first random number;
generating an encrypted text of the first input value based on the system parameter, the first random number, and the first public key;
generating a certificate that authenticates a range of the first input value based on the system parameter, the first random number used for generating the encrypted text, the first public key, and the second public key;
generating a decrypted text by decrypting a noisy encrypted text transmitted from the second device based on the system parameter, the first public key, and a private key held by the first device;
generating a first product share of the first device by removing a noise from the decrypted text; and
confirming that a sum of the first product share held by the first device and a second product share held by the second device is a product of the first input value to the first device and a second input value input to the second device, which is contained in a decrypted text generated by the decryption device, and
the second device performs the method comprising:
generating a commitment of a second input value input to the second device based on the system parameter and a second random number;
authenticating that a plain text of the encrypted text of the first input value is within the range based on the system parameter, the first public key, the second public key, and the certificate;
generating the second product share held by the second device;
generating a noisy product encrypted text of data acquired by adding the noise to a product of the plain text of the encrypted text of the first input value and the second input value based on the encrypted text of the first input value, the second input value, and the second product share; and
confirming that the sum of the generated second product share of the second device and the first product share held by the first device is the product of the first input value and the second input value.

7. The multi-party distributed multiplication method as claimed in claim 6, wherein
the confirmation processing performed by the first device is applied to an encryption processing of confirming whether or not there is an illegitimate action taken in a communication conducted with the second device.

8. The multi-party distributed multiplication method as claimed in claim 6, wherein the confirmation processing performed by the second device is applied to an encryption processing of confirming whether or not there is an illegitimate action taken in a communication conducted with the first device.

9. A multi-party distributed multiplication system which identifies legitimacy of a conversation through a mutual communication, comprising:
a first device which comprises a first initial setting means for generating and disclosing a first public key by using an input system parameter; and
a second device which comprises a second initial setting means for generating and disclosing a second public key by using an input system parameter, wherein:
the first device includes
a first commitment generation means for generating a first commitment of a first input value input to the first device based on the input system parameter and a first random number,
encryption means for generating a first encrypted text of the first input value based on the input system parameter, the first random number, and the first public key,
a first authentication means for generating a first certificate that authenticates a range of the first input value based on the input system parameter, the first random number used for generating the first encrypted text, the first public key, and the second public key,
decryption means for generating a decrypted text by decrypting a noisy encrypted text transmitted from the second device based on the input system parameter, the first public key, and a private key held by the decryption means,
noise removal means for generating a first product share of the first device by removing a noise from the decrypted text, and
a first result confirmation authentication means for confirming that a sum of the first product share of the first device and a second product share held by the second device is a product of the first input value and a second input value input to the second device which is contained in the decrypted text generated by the decryption means; and
the second device includes
a second commitment generation means for generating a second commitment of the second input value input to the second device based on the input system parameter and a second random number;
a second authentication means for authenticating that a plain text of the first encrypted text of the first input value is within the range based on the input system parameter, the first public key, the second public key, and the first certificate,
share generation means for generating the second product share held by the second device,
encrypted text generation means for generating a second encrypted text of data acquired by adding the noise to a product of the plain text of the first encrypted text of the first input value and the second input value as the noisy product encrypted text based on the first encrypted text of the first input value, the second input value, and the second product share, and
a second result confirmation authentication means for confirming that the sum of the second product share of the second device generated by the share generation means and the first product share held by the first device is the product of the first input value and the second input value.

10. A multi-party distributed multiplication device used in a multi-party distributed multiplication system which identifies legitimacy of a conversation between a first device and a second device via a mutual communication of the devices, the multi-party distributed multiplication device comprising:
initial setting means for generating and disclosing a first public key by using an input system parameter;
commitment generation means for generating a commitment of a first input value input to the first device based on the input system parameter and a random number;
encryption means for generating an encrypted text of the first input value based on the system parameter, the random number, and the first public key,
authentication means for generating a certificate that authenticates a range of the first input value based on the system parameter, the random number used for generating the encrypted text, the first public key, and a second public key disclosed by the second device;
decryption means for generating a decrypted text by decrypting a noisy encrypted text transmitted from the second device based on the system parameter, the first public key, and a private key held by the decryption device;
noise removal means for generating a product share of the first device by removing a noise from the decrypted text, and
result confirmation authentication means for confirming that a sum of the product share of the first device and a product share held by the second device is a product of the first input value and a second input value input to the second device which is contained in the decrypted text generated by the decryption means.

11. A multi-party distributed multiplication device used in a multi-party distributed multiplication system which identifies legitimacy of a conversation between a first device and a second device via a mutual communication of the devices, the multi-party distributed multiplication device comprising:
initial setting means for generating and disclosing a first public key by using an input system parameter;
commitment generation means for generating a commitment of a first input value input to the second device based on the input system parameter and a random number;
authentication means for authenticating that a plain text of an encrypted text of a second input value is within a range based on the input system parameter, a second public key disclosed by the first device, the first public key, and a certificate from the first device;
share generation means for generating a product share held by the second device;
encrypted text generation means for generating a noisy product encrypted text of data acquired by adding a noise to a product of the plain text of the encrypted text of the second input value and the first input value as the noisy product encrypted text based on the encrypted text of the second input value, the first input value, and the product share of the second device; and
result confirmation authentication means for confirming that a sum of the product share of the second device generated by the share generation means and a product share held by the first device is a product of the first input value and the second input value.

* * * * *